US007123598B1

(12) United States Patent
Chaskar

(10) Patent No.: US 7,123,598 B1
(45) Date of Patent: Oct. 17, 2006

(54) EFFICIENT QOS SIGNALING FOR MOBILE IP USING RSVP FRAMEWORK

(75) Inventor: Hemant M. Chaskar, Woburn, MA (US)

(73) Assignee: Nokia Inc., Irving, TX (US)

(*) Notice: Subject to any disclaimer, the term of this patent is extended or adjusted under 35 U.S.C. 154(b) by 976 days.

(21) Appl. No.: 09/897,151

(22) Filed: Jun. 29, 2001

(51) Int. Cl.
*H04Q 7/00* (2006.01)
(52) U.S. Cl. ...................... 370/331; 370/348
(58) Field of Classification Search ............... 370/329, 370/330, 331, 348, 349, 338, 341, 231, 235, 370/443, 352, 351; 455/436, 437; 709/220, 709/225, 226, 227, 228, 229, 245
See application file for complete search history.

(56) References Cited

U.S. PATENT DOCUMENTS

| | | | | |
|---|---|---|---|---|
| 5,345,467 | A * | 9/1994 | Lomp et al. ............... | 370/331 |
| 5,787,080 | A | 7/1998 | Hulyalkar et al. | |
| 6,366,577 | B1 * | 4/2002 | Donovan .................... | 370/352 |
| 6,578,085 | B1 * | 6/2003 | Khalil et al. ............... | 709/241 |
| 6,636,498 | B1 * | 10/2003 | Leung ........................ | 370/338 |
| 6,654,610 | B1 * | 11/2003 | Chen et al. ................. | 455/450 |
| 6,728,365 | B1 * | 4/2004 | Li et al. ..................... | 379/329 |
| 6,760,444 | B1 * | 7/2004 | Leung ........................ | 380/270 |
| 6,763,007 | B1 * | 7/2004 | La Porta et al. ........... | 370/331 |
| 2001/0027490 | A1 * | 10/2001 | Fodor et al. ................ | 709/238 |
| 2002/0085528 | A1 * | 7/2002 | Reza et al. ................. | 370/338 |
| 2002/0150062 | A1 * | 10/2002 | Zheng et al. ............... | 370/331 |

FOREIGN PATENT DOCUMENTS

EP    1 047 244 A1    10/2000
WO    WO 99/33301    7/1999

OTHER PUBLICATIONS

Bernet, *The Complementary Roles of RSVP and Differentiated Services in the Full-Service QoS Network*, IEEE Communications Magazine, Feb. 2000, 154-162.
Talukdar, *MRSVP: A Resource Protocol for an Integrated Services Network with Mobile Hosts*, 1-29.
Thomas, *Analysis of Mobile IP and RSVP Interactions*, Internet Draft, 1-45 http://web.archive.org/web/20010417143747.
Perkins, *Fast Handovers for Mobile IPv6*, Internet Draft, 1-25 http://web.archive.org/web/20010620080548.
Perkins, *A Context Transfer Framework for Seamless Mobility*, Internet Draft, 1-19 http://web.archive.org/web/20010418141430.
TSG-P QoS concepts and mechanisms (Release C3) Rev. 0.1 (Apr. 2001), 22 pages.

* cited by examiner

*Primary Examiner*—Doris H. To
*Assistant Examiner*—Ian N. Moore
(74) *Attorney, Agent, or Firm*—Banner & Witcoff, Ltd.

(57) ABSTRACT

A system and method for efficient QoS signaling for mobile IP using RSVP framework in which mobile nodes are connected to correspondent nodes via plurality of intermediate nodes. The method has the steps of: programming in the mobile node for data packets propagating upstream data from a mobile node to correspondent node via intermediate nodes; initiating in the mobile node a first PATH message for upstream data; sending the first PATH message from the mobile node to the correspondent node via the intermediate nodes; programming in the correspondent node for data packets propagating downstream data from the correspondent node to the mobile node via the intermediate nodes; initiating in the correspondent node a first RSVP message for downstream data; sending the first RSVP message from the correspondent node to the mobile node via the intermediate nodes; and thereafter sending REFRESH messages only between intermediate nodes.

30 Claims, 7 Drawing Sheets

EFFICIENT QOS SIGNALING FOR MOBILE IP USING RSVP FRAMEWORK

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates in general to end-to-end QoS signaling protocol in wide area networks and, in particular, to network nodes that are mobile.

DESCRIPTION OF THE RELATED ART

RSVP (RFC 2205) is the end-to-end QoS signaling protocol developed by IETF. Originally, RSVP was designed as a signaling counterpart of IntServ (RFC 2210). IntServ did not gain popularity as a QoS mechanism for the core Internet due to the scalability concerns associated with it. Nonetheless, RSVP remains to be a dominant end-to-end signaling protocol. It has been proposed to use RSVP as an end-to-end QoS signaling protocol even when the end-to-end path consists of a mix of IntServ, DiffServ and MPLS network domains. RSVP messages are processed in the IntServ clouds in the end-to-end path as defined in RFC 2209. At DiffServ and MPLS clouds, RSVP messages are processed only at the edges, and then, are transported transparently through the cloud.

An important characteristic of RSVP operation is that it is a receiver-oriented protocol. In this, a source sends a PATH message to a receiver, and the receiver sends RESV along the same route as PATH but in the opposite direction as that of PATH. RESV performs actual resource reservation. This mode of RSVP signaling is called an OPWA (One Pass with Advertisement) mode. OPWA achieves certain desirable features in multicast scenarios. Due to OPWA, different receivers listening to the same multicast group can actually demand different levels of resource from the network, based on their requirements and intent to pay for the resource.

RSVP uses soft state approach, i.e., PATH and RESV states created in the intermediate nodes need to be refreshed at regular intervals. If not refreshed before a predetermined timeout period, the states are deleted from the intermediate nodes. This approach attains robustness against topology changes in the network.

With regards to RSVP with mobile IP, mobility was never an issue during the design of RSVP and, in fact, RSVP performs poorly when used in mobile environments. Indeed, it has been shown that direct application of RSVP to mobile IP packet flows causes unacceptable latency in QoS establishment along the new packet path after handover. This latency is due to the OPWA model used by RSVP, which may be acceptable at the time of call initiation, but not acceptable in the middle of an active call as is the case in mobile IP handovers.

Despite its inefficiency in the mobile environment and the design optimized for IntServ, RSVP remains to be an important end-to-end signaling protocol. This is because it has been implemented in the products of major IP vendors such as Cicso Systems, which are deployed at a global Internet scale. Also, newer versions of end systems operating systems such as Microsoft Windows provide RSVP API. Political factors are responsible as well for RSVP to stay for a foreseeable future. Presently there is no protocol alternative to RSVP for end-to-end signaling.

RSVP was designed in IETF as the signaling counterpart of IntServ QoS mechanism. IntServ did not become popular in the core of the Internet due to the scalability concerns associated with it. However, RSVP still remains to be a dominant end-to-end signaling protocol. It has been proposed to use RSVP as an end-to-end QoS signaling protocol even when the end-to-end path consists of a mix of IntServ, DiffServ and MPLS network domains. RSVP messages are processed in the IntServ clouds in the end-to-end path as defined in RFC 2209. At DiffServ and MPLS clouds, RSVP messages are processed only at the edges, and then, are transported transparently through the cloud.

Receiver-oriented reservation style, round trip (PATH and RESV) reservation model also called One Pass with Advertisement (OPWA), soft state (and consequent need for periodic REFRESH), multicast efficiency and simplex reservations are some of the key characteristics of RSVP operation. However, mobility of end nodes was never a central concern during the design of RSVP. Indeed, RSVP performs poorly in the mobile environments. Periodic REFRESH messages cause wastage of bandwidth on the wireless link to which mobile node is attached. Furthermore, the OPWA reservation model used by RSVP causes unacceptable delays in programming QoS along the new end-to-end path after a mobile node undergoes handover.

It is a drawback of the prior art that RSVP performs poorly when used in mobile environments, including the unacceptable latency along the new packet path after handover.

SUMMARY OF THE INVENTION

In general terms the present invention is a system and method for efficient QoS signaling for mobile IP using RSVP framework in which mobile nodes are connected to correspondent nodes via a plurality of intermediate nodes. The method has the steps of: programming in the mobile node for data packets propagating upstream data from a mobile node to correspondent node via intermediate nodes; initiating in the mobile node a first PATH message for upstream data; sending the first PATH message from the mobile node to the correspondent node via the intermediate nodes; programming in the correspondent node for data packets propagating downstream data from the correspondent node to the mobile node via the intermediate nodes; initiating in the correspondent node a first RSVP message for downstream data; sending the first RSVP message from the correspondent node to the mobile node via the intermediate nodes; and thereafter sending REFRESH messages only between intermediate nodes.

The present invention provides an end-to-end QoS signaling framework that uses existing RSVP framework, but is optimized for Mobile IP. According the to the present invention there is a saving of the overhead of RSVP REFRESH messages on the costly wireless link. This is achieved by delegating the responsibility of generating REFRESH messages and replying to them to the access routers rather than the mobile node. Also there is an eliminating of the latency in QoS programming along the new packet path after handover. This is achieved via proactively completing RSVP's OPWA transactions before actual handover occurs. The procedure of the present invention achieves this by making use of the fast handover and context transfer frameworks defined in IETF.

The new RSVP functionalities that achieve the above-mentioned objectives fully reside in the access routers, and no modification is required to the internal RSVP-capable routers in the network. Further, it is possible that access router at only one of the two end points of end-to-end packet path implements these functionalities. In that case, the above-mentioned benefits are available only at that end of the end-to-end path.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
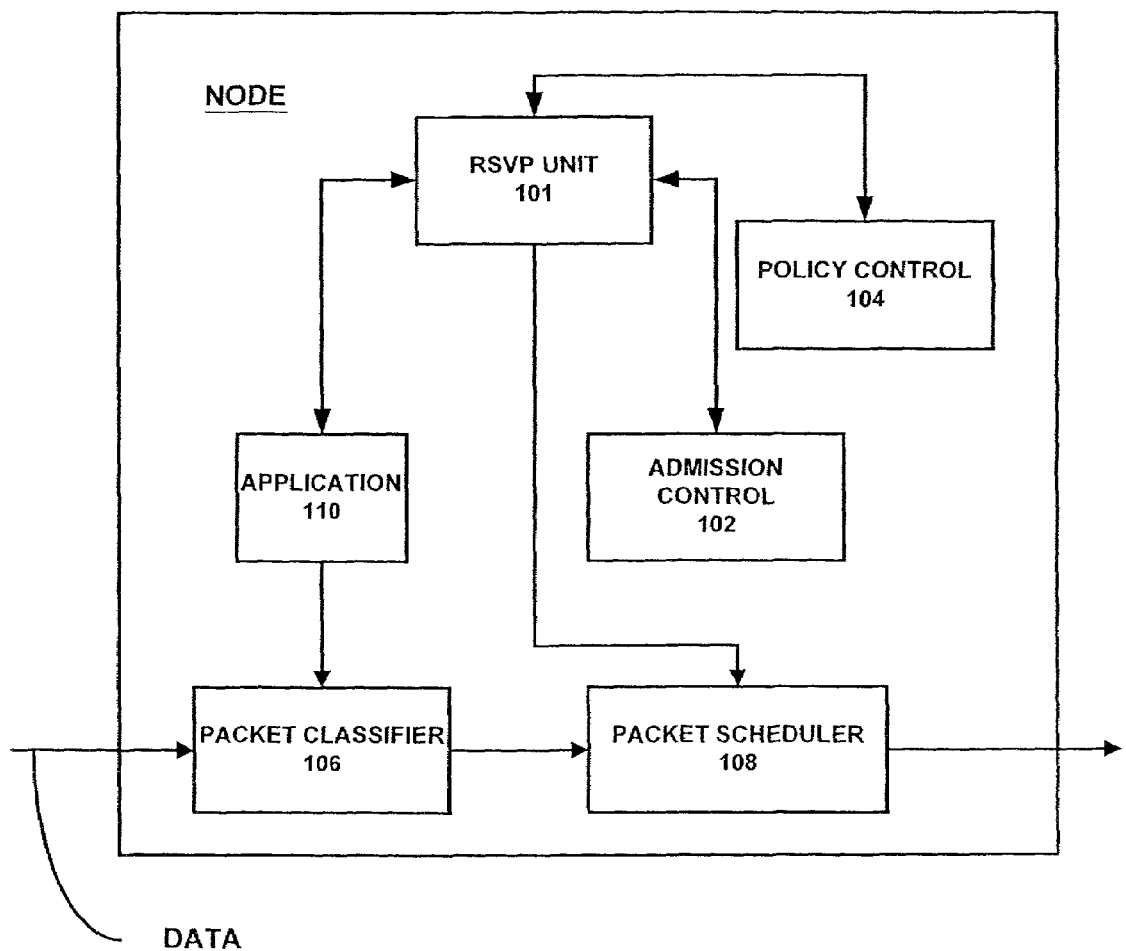
FIG. 1 is a schematic illustration of a node in a wide area network that is utilized by the present invention.

A host uses RSVP to request a specific Quality of Service (QoS) from the network, on behalf of an application data stream. RSVP carries the request through the network, visiting each node the network uses to carry the stream. At each node, RSVP attempts to make a resource reservation for the stream.

To make a resource reservation at a node, the RSVP unit 101 communicates with two local decision modules, admission control 102 and policy control 104. Admission control 102 determines whether the node has sufficient available resources to supply the requested QoS. Policy control 104 determines whether the user has administrative permission to make the reservation. If either check fails, the RSVP program returns an error notification to the application process that originated the request. If both checks succeed, the RSVP unit 101 sets parameters in a packet classifier 106 and packet scheduler 108 to obtain the desired QoS. The packet classifier 106 determines the QoS class for each packet and the scheduler 108 orders packet transmission to achieve the promised QoS for each stream.

Figure 2:
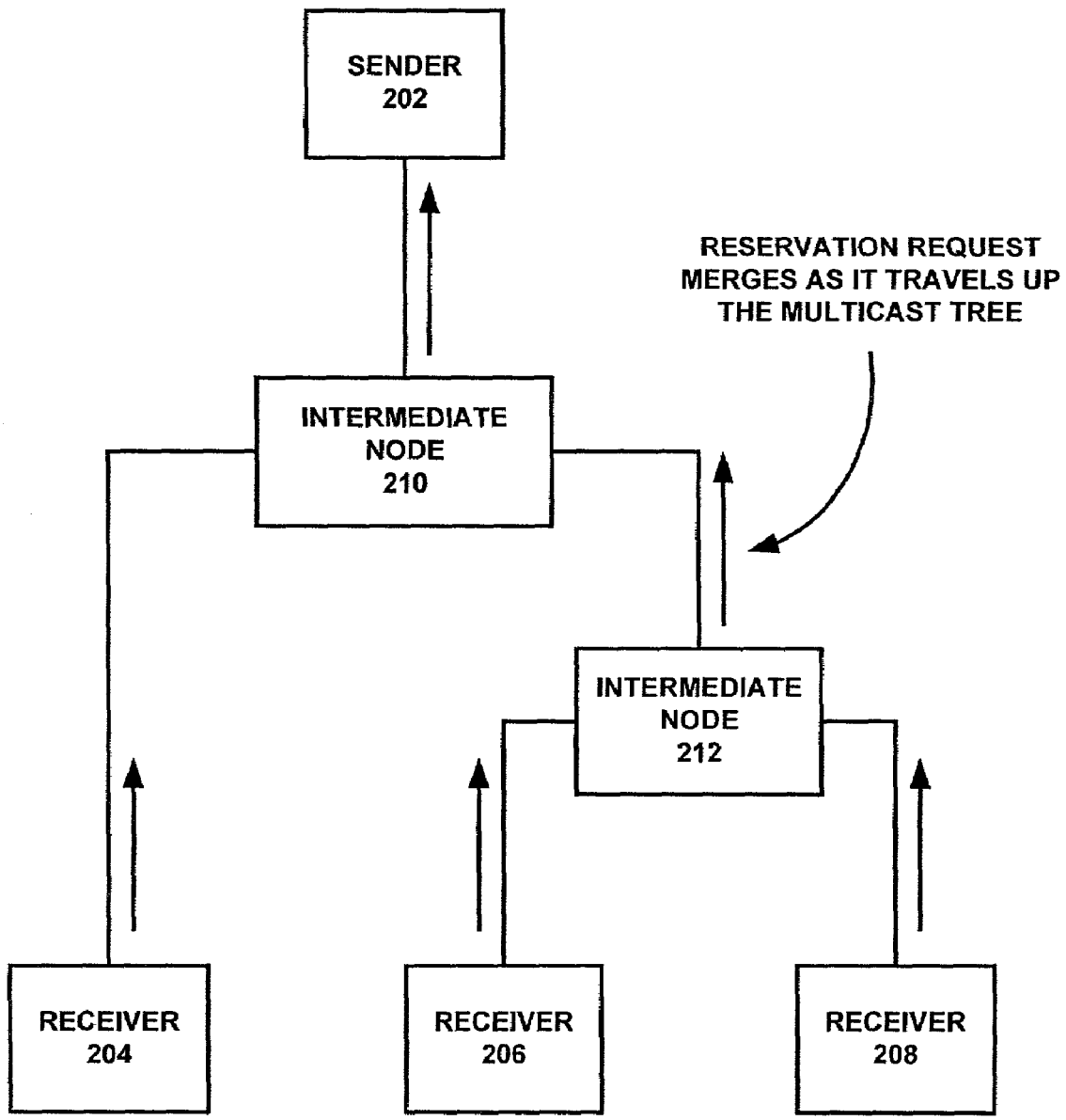
FIG. 2 is a schematic illustration of one example of interconnected nodes in the wide area network that is utilized by the present invention.

RSVP is also designed to utilize the robustness of current Internet routing algorithms. RSVP does not perform its own routing; instead it uses underlying routing protocols to determine where it should carry reservation requests. As routing changes paths to adapt to topology changes, RSVP adapts its reservation to the new paths wherever reservations are in place. FIG. 2 depicts a Sender 202 connected to three receivers 204, 206, and 208 via respective intermediate nodes 210 and 212.

Figure 3:
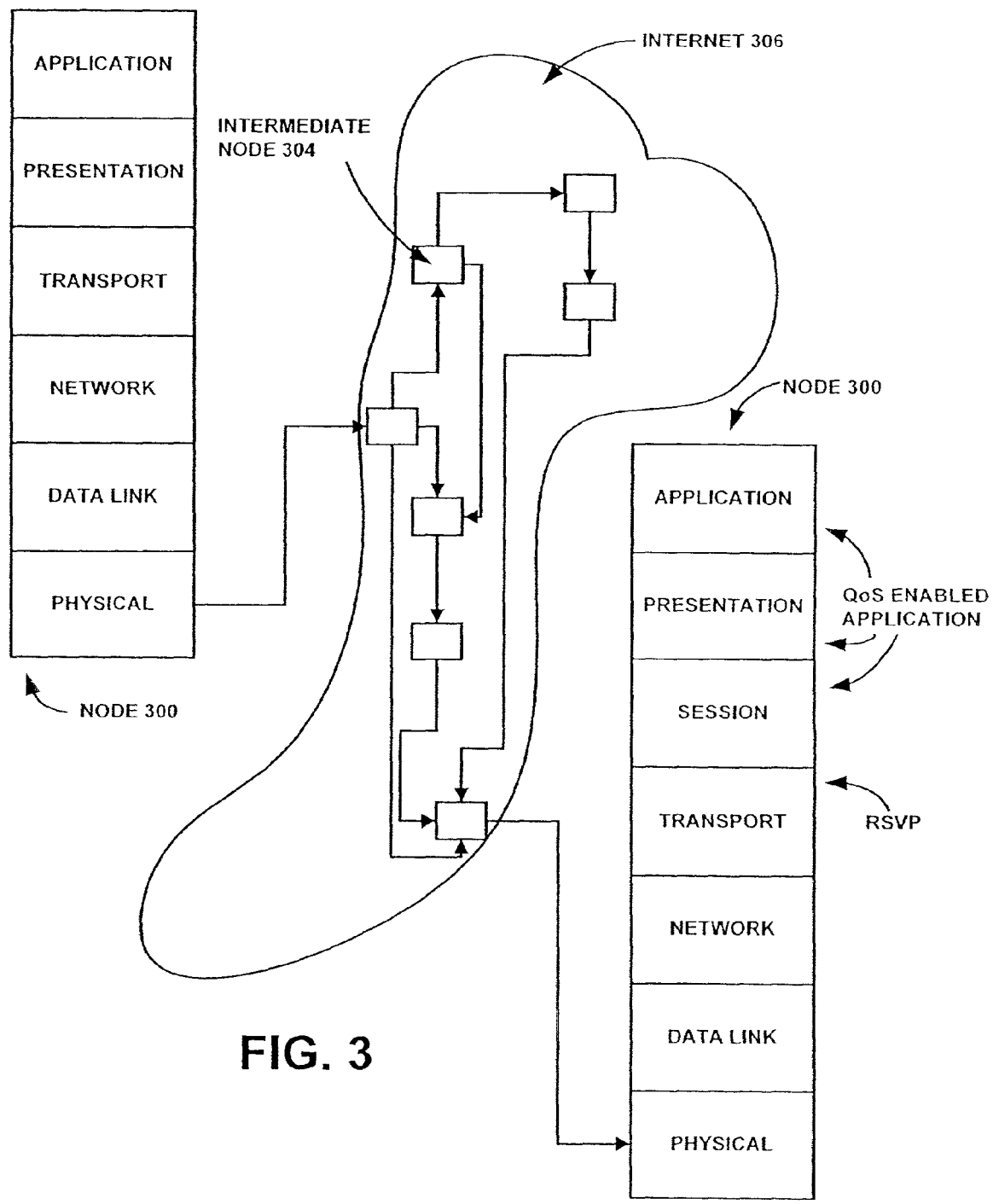
FIG. 3 is a schematic illustration of the various protocols in a node in the wide area network that is utilized by the present invention.

FIG. 3. depicts the protocol structure for typical nodes n the wide area network. A node typically has the layers of: physical, data link, network, transport, session, presentation, and application. A node 300 is connected to a node 302 via intermediate nodes 304 in the Internet 306.

Figure 4:
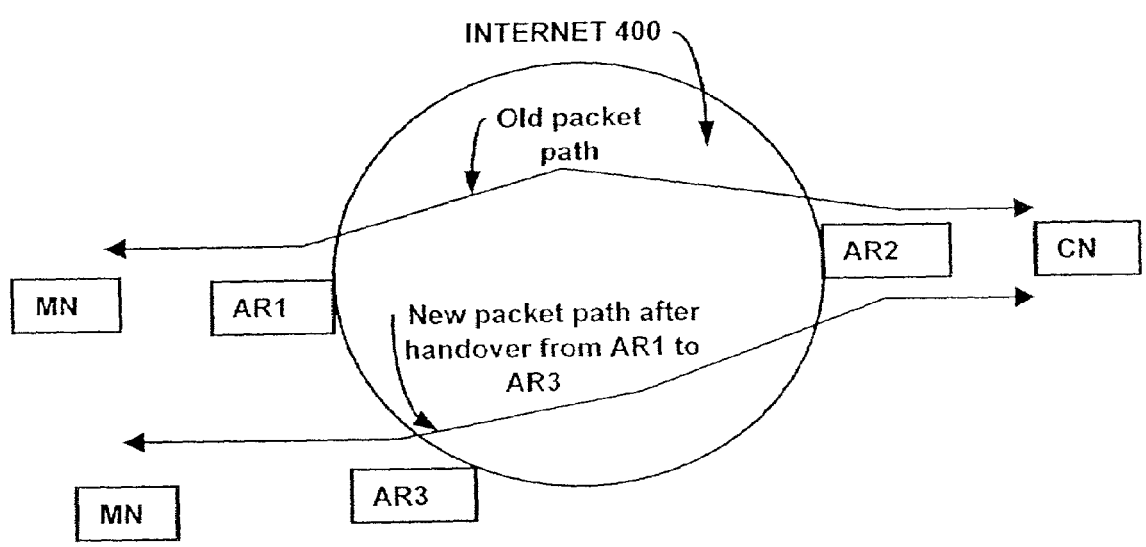
FIG. 4 depicts connection of mobile nodes to one another via a wide area network, such as the Internet.

The following terminology is used in FIG. 4: MN; Mobile Node, CN; Correspondent Node, and Arx; Access Router x. The present invention is directed to the mobility of node MN. It is to be noted that when node CN moves, the actions triggered will be exactly the same as those triggered by MN's movement, but at the other end of the communication path. Initially, node MN is attached to node AR1, and node CN (which is mobile as well) is attached to node AR2. The network between AR1 and AR2 is shown as a cloud (Internet 400), because there are no modifications inside the network 400. Depicted in FIGS. 5, 6 and 7 is a scenario where MN initiates a bi-directional QoS-sensitive session from AR1, and later during the session, is handed over to AR3.

Figure 5:
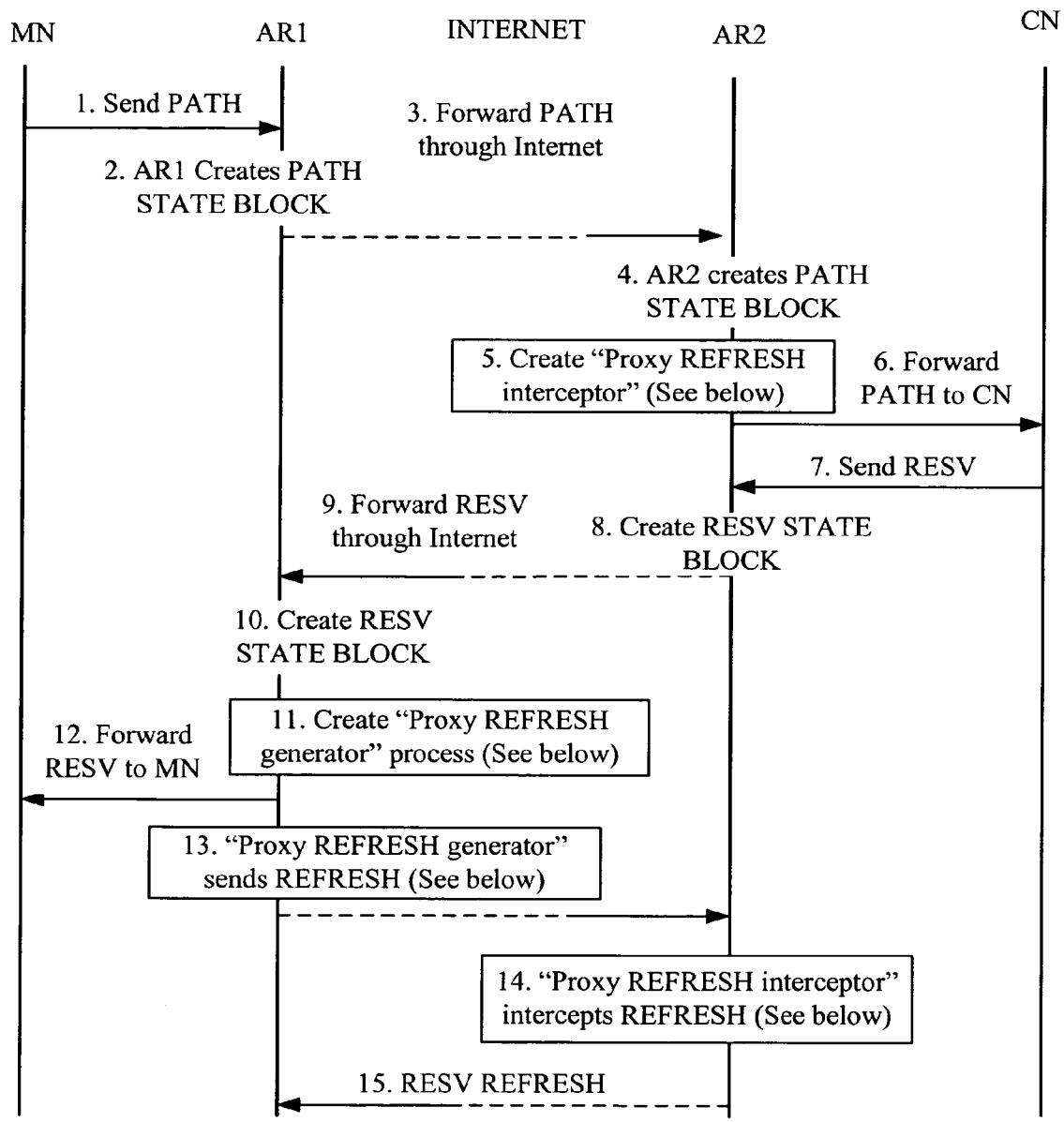
FIG. 5 is a schematic illustration of the operation of the present invention.

The signaling or message flow is shown in FIG. 5. There, the new functions required in the ARs are highlighted by the gray areas. Every intermediate RSVP-capable node creates a PATH STATE BLOCK and a RESV STATE BLOCK when it receives PATH and RESV messages respectively. These states are periodically refreshed by the REFRESH messages sent by end hosts. The present invention augments these states in the AR with an indicator that informs the RSVP process running in the AR to perform proxy REFRESH generation and interception. Thus, the RSVP process running in the AR would generate REFRESH messages for this PATH STATE BLOCK, which in normal circumstances would have been generated by the end host. Also, this process would intercept the REFRESH message arriving for its RESV STATE BLOCK, meaning that it would not forward the REFRESH message over the wireless link.

Note that MN is attached to AR1 at the time of new flow initiation. Also, the figure shows QoS programming for data packets propagating from the MN to the CN (referred here as "upstream data"). MN initiates the first PATH message for upstream data. Similar signaling would occur for QoS programming for data packets propagating from the CN to the MN (referred here as "downstream data"), if the session happens to be bi-directional (e.g. VoIP). CN would initiate such QoS signaling for downstream data by sending the first PATH message to MN after, say, SIP transactions are completed. AR2 creates a process to intercept future PATH messages that would match the just created PATH STATE BLOCK. These future PATH messages are not forwarded over the wireless link to the CN. This process is termed "Proxy REFRESH interceptor." AR1 creates a process to generate PATH messages (REFRESH messages) for the PATH STATE BLOCK matching the RESV message. This process will generate REFRESH messages on behalf of MN. This process is termed "Proxy refresh generator." The "Proxy REFRESH generator" at AR1 generates a REFRESH message and the "Proxy REFRESH interceptor" at AR2 intercepts the REFRESH message and does not forward it to CN.

Figure 6:
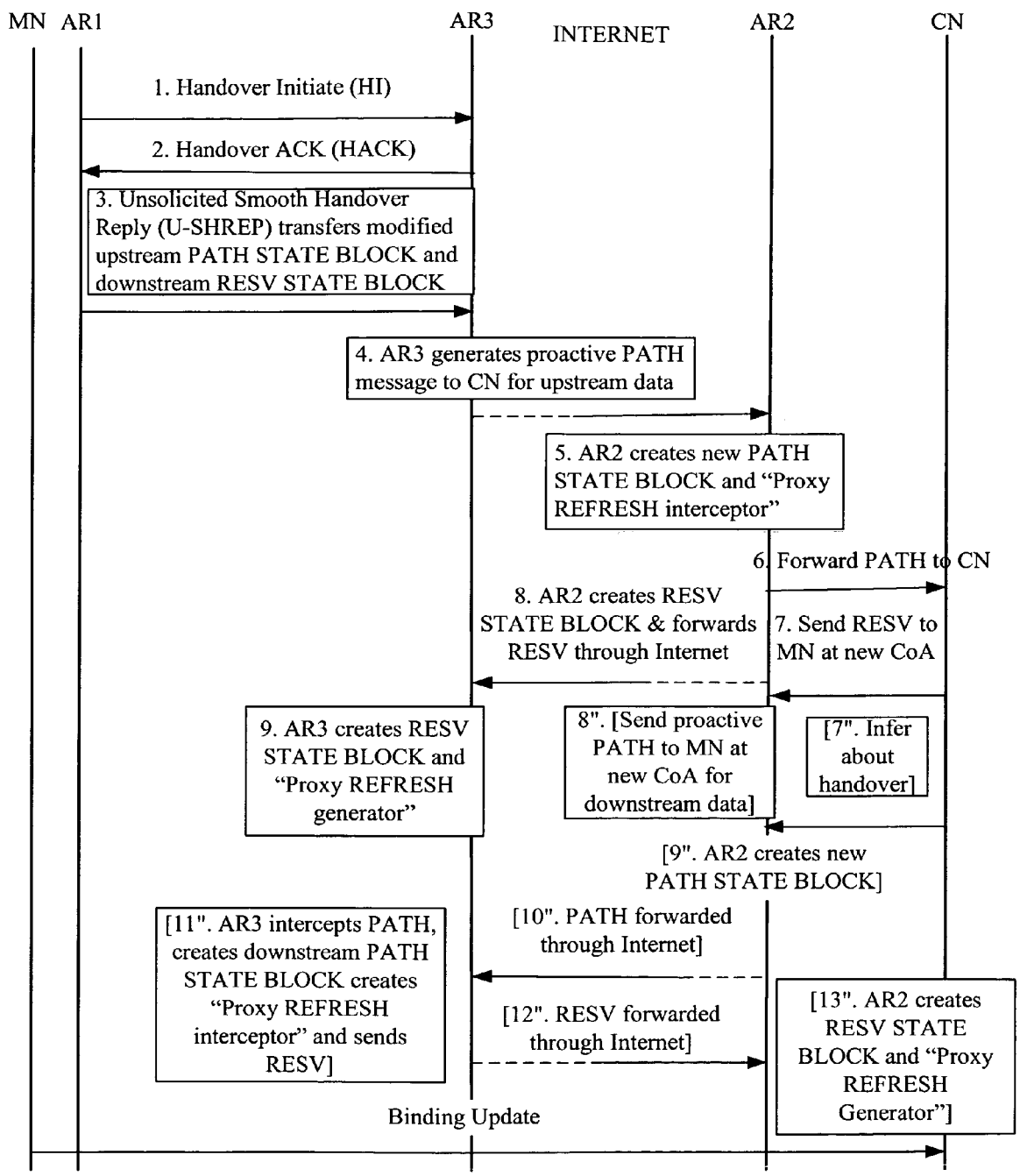
FIG. 6 is a schematic illustration of handover during the operation of the present invention.
Figure 7:
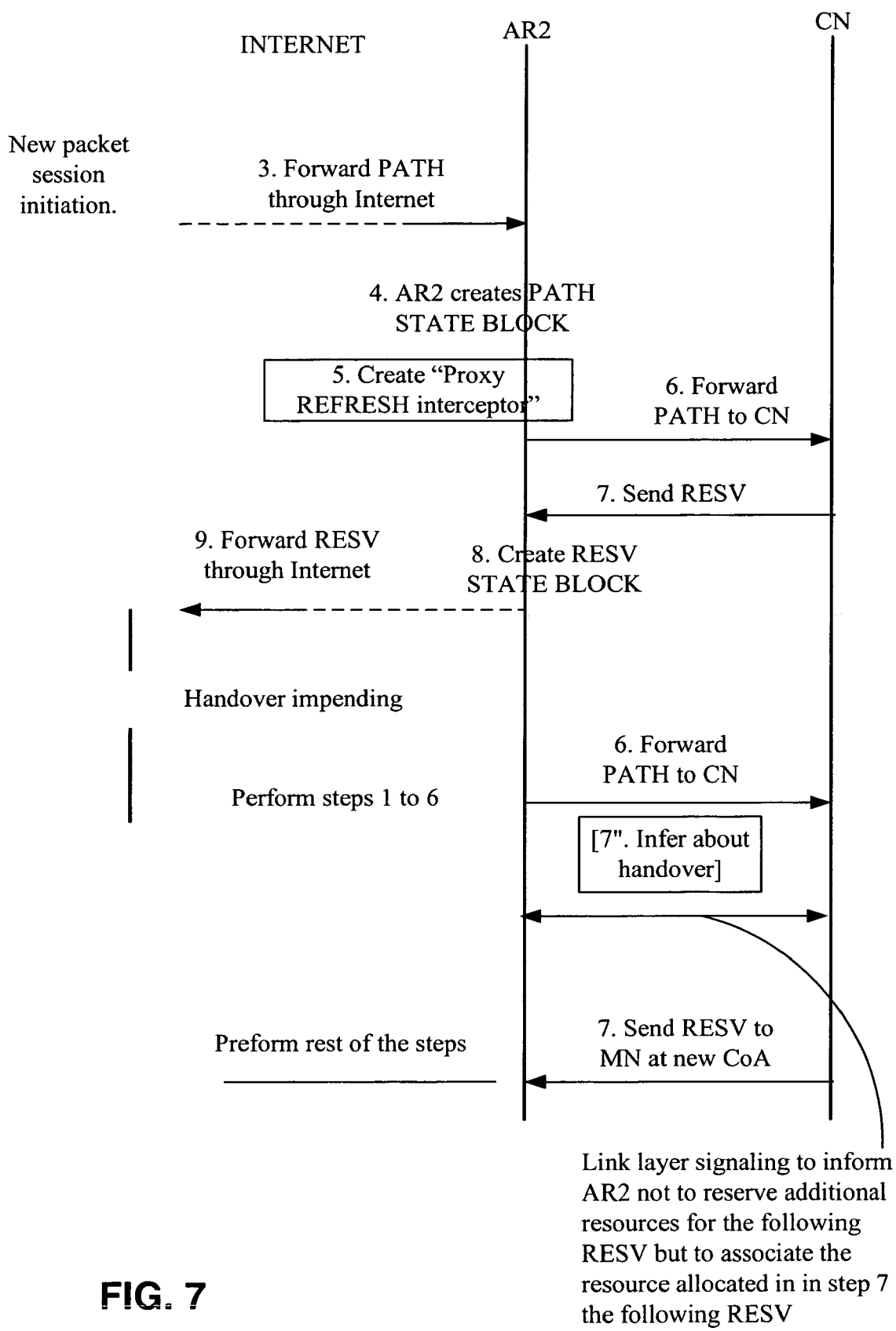
FIG. 7 is a schematic illustration of another embodiment of the present invention for handover during the operation of the present invention.

FIG. 6 depicts a case where MN is to be handed over from AR1 to AR3. It is assumed that AR1 and AR3 are equipped with fast handover and context transfer protocols defined in IETF. Then, the following sequence of events occurs. Again, the new functions are highlighted. Note that the goal is to establish QoS along the new packet path as quickly as possible, so that end-to-end QoS degradation during handover is minimized. The following are the sequence of events to achieve this goal.

1) AR1 sends Handover Initiate (HI) message to AR3. HI contains the new CoA (Care of Address) of MN that AR1 forms on behalf of AR3. HI is one of the messages defined in fast handover framework.
2) AR3 performs duplicate address detection and if the CoA formed by AR1 is not already in use at AR3, AR3 replies with success using a Handover ACK (HACK) message. Again, HACK is one of the messages defined in the fast handover framework.
3) AR1 modifies the PATH STATE BLOCK for upstream packet stream by replacing the sender IP address in the SENDER TEMPLATE by the new CoA. The modified upstream PATH STATE BLOCK is transferred from AR1 to AR3 in the Unsolicited Smooth Handover Reply (U-SHREP) message. U-SHREP is one of the messages defined in the context transfer framework.

AR1 also modifies the RESV STATE BLOCK for downstream packet stream by replacing the IP address in the SESSION OBJECT by the new CoA. The modified downstream RESV STATE BLOCK is also transferred in U-SHREP message. This block will later be used in Step 11.

4) Once AR3 receives upstream PATH STATE BLOCK from AR1 in U-SHREP message, it initiates PATH message to CN. Note that the IP address of CN is available in the SESSION OBJECT of the PATH STATE BLOCK just transferred from AR1 to AR3.
5) The PATH message generated by AR3 is forwarded through the Internet and through AR2 to CN. AR2 creates a new PATH STATE BLOCK and a new "Proxy REFRESH interceptor" process corresponding to it.
9) AR3 creates a new upstream RESV STATE BLOCK and a new "Proxy REFRESH generator" process for the upstream packet stream.

At this point it is essential to understand the following issue: How does CN know that the arriving PATH message from Step 5 is for the already running session that is undergoing handover on the other side of the network, and not for the newly starting session? Note that the SENDER TEMPLATE in this PATH message contains new CoA.

This is particularly important for the bi-directional QoS-sensitive streams. This is because the PATH message generated by AR3 takes care of QoS programming along the path of packets propagating from MN to CN (upstream direction) after handover. However, for packets propagating from CN to MN, CN has to send PATH message in that direction (downstream direction). The latest CN can infer about handover is when Binding Update arrives at CN from the MN's new CoA. However, that can be too late as the packets generated by MN over the duration of one round trip time and using new CoA as a source address will get default forwarding treatment. It is thus required to trigger PATH message in a direction from CN to MN earlier than that.

7") There is no general way that CN can infer about the handover on the other side of the network before it receives Binding Update. However, this can be done for the most important special case: The case where a separate session establishment protocol such as, say SIP, is used to for call set up. Then, the CN has a good knowledge of session characteristics. For the present purpose, it is only required for the CN to infer that the session on a particular "port number" is bi-directional and needs QoS for packets propagating in both directions.

The CN examines the SESSION OBJECT in the arriving PATH message, and compares the "port number" in the SESSION OBJECT with the port numbers that are already active on the CN. If it finds a match and if that port number is being used by a session known to CN (i.e., CN knows that it is not possible that a new call request can arrive over that port number), the CN infers that the arriving PATH message is for the session that is already running.

The following messages occur only if CN successfully infers about handover as described above. If it does not, then those messages occur after CN receives Binding Update from MN's new CoA.

8") CN sends proactive PATH message to MN at new CoA so as to program QoS for packets propagating from CN to MN (downstream) along the new network path.
11") Downstream PATH generated by CN arrives at AR3. AR3 creates a new "Proxy REFRESH interceptor" process. AR3 intercepts this downstream PATH message, and using the modified downstream RESV STATE BLOCK that it obtained from AR1 in U-SHREP in Step 3, sends RESV to CN.

Finally, MN sends Binding Update (registration of the CoA with the correspondent node) to CN from the new CoA.

Some of the benefits of the present invention are as follows: bandwidth saving on wireless link to which MN is attached, PATH and RESV corresponding to upstream packet stream traverse the wireless link to which MN is attached, only at the time of flow initiation; REFRESH messages do not traverse the wireless link; and even when MN undergoes handover, there is no need of any RSVP transactions traversing the wireless link to which MN is attached.

At the time of handover, end-to-end RSVP signaling is initiated proactively in order to reduce QoS degradation during handover. The amount of bandwidth saving on the wireless links is similar to that described above for the upstream packet stream, with the roles of MN and CN interchanged. At the time of handover of MN on the other side of the network, this invention provides considerable benefit by reducing the otherwise unacceptable latency in QoS programming along the new downstream packet path.

This invention enhances RSVP message processing functions only at the end points of the communication path, namely end terminals and access routers. No modification to the internal RSVP-capable routers in the network is required. Further, it is also acceptable that only a subset of the access routers at the two ends and the mobile terminals at the two ends, implements these functionalities and the protocol is still correct. It is only that the performance benefits are not available at the end, which does not implement these enhancements.

Note that in Step 5 of handover, AR2 creates a new PATH STATE BLOCK for the already existing upstream packet flow. In Step 7, a RESV STATE BLOCK for this PATH STATE BLOCK is created. In the absence of any other mechanism, the RESV message in Step 7 may cause double reservation on the wireless link to which CN is attached. This double reservation scenario will persist for a short time, after which the old PATH and RESV STATE BLOCKS will be automatically deleted due to the absence of REFRESH messages. FIG. 7 depicts an embodiment of the present invention which overcomes this situation.

This double reservation can be avoided if the CN can infer about the MN's handover on the other side of the network as described in Step 7". In that case, the CN can inform AR2 using some link layer signaling not to reserve any new link layer resources for the RESV sent in Step 6, and to map the new RESV STATE BLOCK to the existing link layer resource reservation.

This invention makes RSVP workable with Mobile IP by proposing some modifications to RSVP message processing functions in the access routers only. No modifications are required at the internal RSVP-capable routers in the network. The invention also removes the overhead of RSVP RFRESH messages on the costly wireless links. Further, at the time of handover, the scheme proposed in the invention considerably decreases the latency in QoS programming along the new end-to-end path for both upstream (MN to CN) and downstream (CN to MN) packet streams.

The present invention overcomes the drawbacks of the prior art. The performance benefits with the present invention are achieved by modifying the RSVP message processing functions in the access routers and the end terminals only. No change is required inside the Internet. Also, only a subset of the two access routers at the two ends and the mobile terminals at the two ends may implement these modifications. The protocol is still correct, only the performance benefits are not available at the end, which does not implement the modifications.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for efficient QoS signaling for Mobile IP protocol using RSVP framework in which mobile nodes are connected to correspondent nodes via a plurality of intermediate nodes, comprising the steps of:
   initiating in the mobile node a first PATH message for upstream data;
   sending the first PATH message for upstream data from the mobile node to the correspondent node via intermediate nodes;
   initiating in the correspondent node a first RESV message for upstream data;
   sending this RESV message for upstream data from the correspondent node to the mobile node via the intermediate nodes;
   thereafter sending REFRESH (periodic PATH and RESV) messages only between intermediate nodes;
   initiating in the correspondent node a first PATH message for downstream data;
   sending the first PATH message for downstream data from the correspondent node to the mobile node via intermediate nodes;
   initiating in the mobile node a first RESV message for downstream data;
   sending the first RESV message for downstream data from the mobile node to the correspondent node via the intermediate nodes;
   thereafter sending REFRESH (periodic PATH and RESV) messages for downstream data only between intermediate nodes;
   handing over the mobile node from an old access router to a new access router; and
   transferring, as part of the handover, PATH and RESV state block information from the old access router to the new access router, whereby an RSVP resource allocated to the mobile node prior to the handover is reused for the mobile node after the handover wherein REFRESH messages are exchanged between the intermediate nodes, wherein the mobile node is attached to a first node of the intermediate nodes by a wireless link, and wherein subsequent REFRESH message do not traverse the wireless link.

2. The method according to claim 1, wherein the correspondent node is attached to a second node of the intermediate nodes by a further wireless link, and wherein subsequent REFRESH messages do not traverse the further wireless link.

3. The method according to claim 1, wherein initial PATH messages and initial RESV messages traverse the wireless link.

4. The method according to claim 1, wherein the correspondent node is attached to a second node of the intermediate nodes by a further wireless link, and wherein initial PATH messages and initial RESV messages traverse the further wireless link.

5. A method for efficient QoS signaling for Mobile IP protocol using RSVP framework in which mobile nodes are connected to correspondent nodes via a plurality of intermediate nodes, comprising the steps of:
   initiating in the mobile node a first PATH message for upstream data;
   sending the first PATH message for upstream data from the mobile node to the correspondent node via intermediate nodes;
   initiating in the correspondent node a first RESV message for upstream data;
   sending the first RESV message, for upstream data from the correspondent node to the mobile node via the intermediate nodes;
   forming a proxy REFRESH generation function for upstream data in a node that is close to the mobile node in the end-to-end packet path and a proxy REFRESH interception function for upstream data in a node that is close to the correspondent node in the end-to-end packet path, so that the REFRESH messages do not traverse the wireless links;
   initiating in the correspondent node a first PATH message for downstream data;
   sending the first PATH message from the correspondent node to the mobile node via intermediate nodes;
   initiating in the mobile node a first RESV message for downstream data;
   sending the first RESV message for downstream data from the mobile node to the correspondent node via the intermediate nodes; and
   forming a proxy REFRESH generation function for downstream data in a node that is close to the correspondent node in the end-to-end packet path and a proxy REFRESH interception function for downstream data in a node that is close to the mobile node in the end-to-end packet path, so that the REFRESH messages do not traverse the wireless links wherein a proxy REFRESH interception function for upstream data responds to the PATH REFRESH message by sending RESV REFRESH message on behalf of the correspondent node, if the latter is attached using the further wireless link; and does not allow PATH REFRESH message to be transmitted over the further wireless link.

6. The method according to claim 5, wherein a proxy REFRESH generation function for upstream data generates PATH REFRESH messages on behalf of the mobile node.

7. The method according to claim 5, wherein a proxy REFRESH generation function for downstream data generates PATH REFRESH messages on behalf of the correspondent node.

8. The method according to claim 5, wherein a proxy REFRESH interception function for downstream data responds to the PATH REFRESH message by sending RESV REFRESH message on behalf of the mobile node, if the latter is attached using the wireless link; and does not allow PATH REFRESH message to be transmitted over the wireless link.

9. The method according to claim 1, wherein the method further comprises performing proactive RSVP signaling for upstream data at the time of handover of mobile node from one access router to another.

10. The method according to claim 1, wherein the method further comprises performing proactive RSVP signaling for downstream data at the time of handover of mobile node from one access router to another.

11. The method according to claim 9, wherein the method further comprises the steps of:

sending from the new access router the PATH message for the upstream data along a new packet path; and sending from the correspondent node the RESV message for the upstream data along the new packet path; and intercepting this RESV message at the new access router.

12. The method according to claim 11, wherein the method further comprises informing the access router to which correspondent node is attached not to reserve any new link resources for the sent RESV message for upstream data.

13. A method for efficient QoS signaling for Mobile IP protocol using RSVP framework in which mobile nodes are connected to correspondent nodes via a plurality of intermediate nodes, comprising the steps of:

initiating in the mobile node a first PATH message for upstream data;

sending the first PATH message for upstream data from the mobile node to the correspondent node via intermediate nodes;

initiating in the correspondent node a first RESV message for upstream data;

sending this RESV message for upstream data from the correspondent node to the mobile node via the intermediate nodes;

thereafter sending REFRESH (periodic PATH and RESV) messages for an upstream stream only between intermediate nodes;

initiating in the correspondent node a first PATH message for downstream data;

sending the first PATH message for downstream data from the correspondent node to the mobile node via intermediate nodes;

initiating in the mobile node a first RESV message for downstream data;

sending the first RESV message for downstream data from the mobile node to the correspondent node via the intermediate nodes;

thereafter sending REFRESH (periodic PATH and RESV) messages for a downstream stream only between intermediate nodes; performing proactive RSVP signaling for upstream data at the time of handover of mobile node from one access router to another;

transferring PATH state block and RESV state block for uplink data from an old access router to a new access router;

sending from the new access router the PATH message for the upstream data along a new packet path;

sending from the correspondent node the RESV message for the upstream data along the new packet path;

intercepting this RESV message at the new access router;

informing the access router to which correspondent node is attached not to reserve any new link resources for the sent RESV message for upstream data, wherein the correspondent node communicates with the access router using link-layer signaling to instruct it not to reserve any new link resources in response to the sent RESV, and instructing the access router to map the sent RESV to already allocated link resource for the mobile node's packet session, thereby avoiding double reservation on the wireless link.

14. The method according to claim 11, wherein the PATH state block and the RESV state block are modified before transferring to reflect a new care-of address of the mobile node.

15. The method according to claim 11, wherein fast handover protocol and context transfer protocol are used to transfer PATH and RESV state blocks for upstream data from the old access router to the new access router.

16. The method according to claim 10, wherein the method further comprises the steps of:

inferring at the correspondent node upon receiving the PATH message for upstream data from the new access router where mobile node is being handed off, about the impending handover of the mobile node using higher layer information;

sending the PATH message from the correspondent node for downstream data along the new packet path; and intercepting this PATH message at the new access router; and sending RESV from the new access router to the correspondent node for the downstream data along the new packet path.

17. The method according to claim 16, wherein the correspondent node upon receiving the PATH message for upstream data from the new access router, infers about the impending handover of the mobile node using the binding of transport layer (UDP or TCP) port with the application.

18. The method according to claim 11, wherein the method further comprises sending subsequent PATH REFRESH messages for the upstream data from the new access router along the new packet path on behalf of the mobile node.

19. The method according to claim 11, wherein the method further comprises the steps of:

intercepting at the access router to which correspondent node is attached, the subsequent PATH REFRESH messages for the upstream data arriving along the new packet path;

initiating at the access router to which correspondent node is attached, the subsequent RESV REFRESH messages for the upstream data; and sending the RESV REFRESH messages along the new upstream packet path.

20. The method according to claim 11, wherein the method further comprises intercepting subsequent RESV REFRESH messages for the upstream data at the new access router so that they do not traverse the wireless link to which the mobile node is attached.

21. The method according to claim 16, wherein the method further comprises sending subsequent PATH REFRESH messages for the downstream data from the access router to which correspondent node is attached along the new packet path on behalf of the correspondent node.

22. The method according to claim 16, wherein the method further comprises intercepting subsequent RESV REFRESH messages for the downstream data at the access router to which correspondent node is attached so that they do not traverse the wireless link to which the correspondent node is attached.

23. The method according to claim 11, wherein the method further comprises the steps of:
   comparing at the new access router, the RESV message for upstream data with the transferred RESV state block from the old access router; and
   informing the mobile node of the result.

24. The method according to claim 23, wherein the method further comprises deciding at the mobile node whether to continue the packet session in case the required resource is not available along the new packet path.

25. The method according to claim 24, wherein the method further comprises tearing down the packet session if the resource availability along the new packet path is not acceptable to the mobile node.

26. The method according to claim 24, wherein the method further comprises adapting the mobile node's application to the resource availability along the new packet path.

27. The method according to claim 5, wherein the method further comprises using a flow ID number in RSVP messaging to identify packet flow.

28. The method according to claim 27, wherein the flow ID number is calculated by hashing a known block of data with user specific key.

29. The method according to claim 28, wherein the user specific key is chosen by a user, and is at least one of a password or a pet word.

30. The method according to claim 27, wherein the method further comprises mapping multiple RSVP FILTER_SPECs to a resource that is identified by the flow ID number.

* * * * *

UNITED STATES PATENT AND TRADEMARK OFFICE
CERTIFICATE OF CORRECTION

| | | |
|---|---|---|
| PATENT NO. | : 7,123,598 B1 | Page 1 of 1 |
| APPLICATION NO. | : 09/897151 | |
| DATED | : October 17, 2006 | |
| INVENTOR(S) | : Hemany M. Chaskar | |

It is certified that error appears in the above-identified patent and that said Letters Patent is hereby corrected as shown below:

In Column 7, Claim 1, Line 48:
  Please replace "messages only" with --messages for upstream data only--

In Column 8, Claim 5, Line 43:
  Please replace "message from" with --message for downstream data from--

In Column 9, Claim 13, Line 59:
  Please replace "a downsteam stream" with --downstream data stream--

Signed and Sealed this

Twentieth Day of March, 2007

JON W. DUDAS
*Director of the United States Patent and Trademark Office*